United States Patent Office.

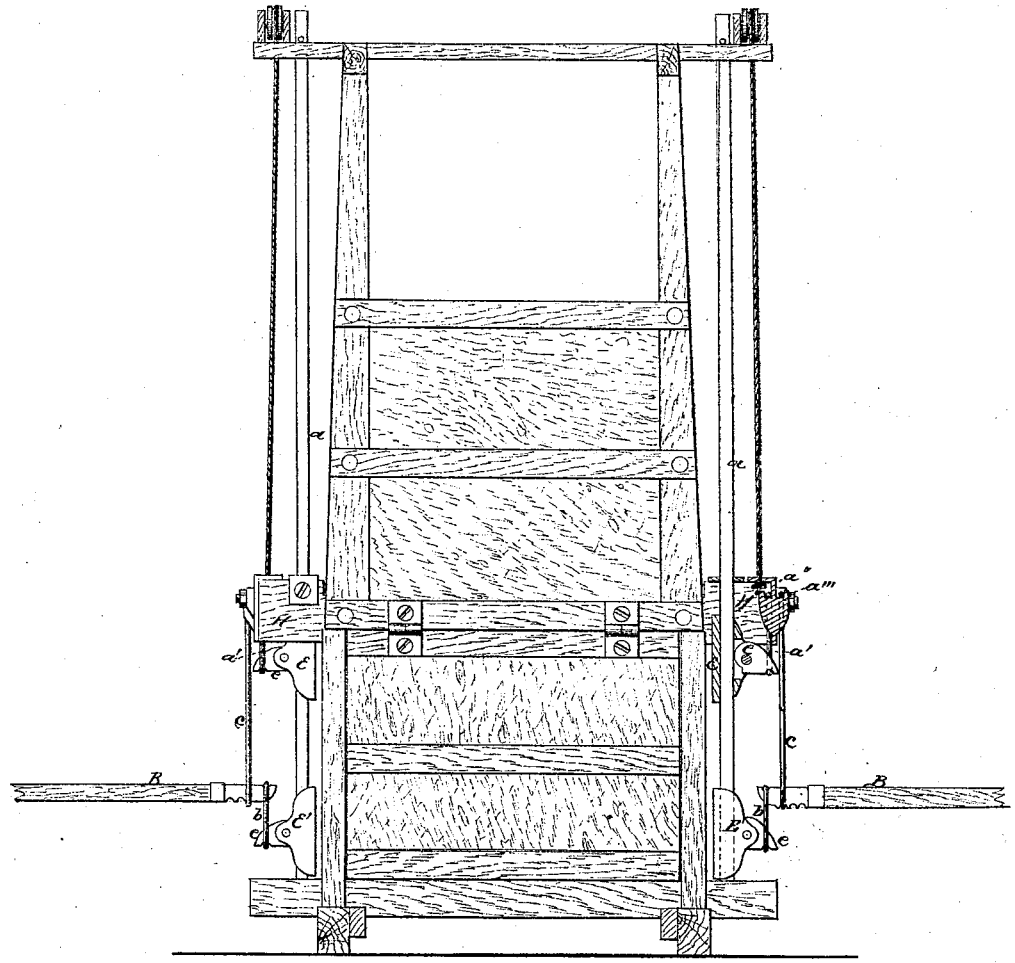

BIRD R. BROWN AND JAMES TOONE, JR., OF JACKSON, TENNESSEE.

Letters Patent No. 103,557, dated May 31, 1870.

IMPROVEMENT IN HAY AND COTTON-PRESSES.

The Schedule referred to in these Letters Patent and making part of the same

*To all whom it may concern:*

Be it known that we, BIRD R. BROWN and JAMES TOONE, Jr., of Jackson, in the county of Madison and State of Tennessee, have invented a new and improved Hay and Cotton-Press; and we do hereby declare that the following is a full, clear, and exact description of the construction and operation of the same, reference being had to the accompanying drawing making a part of this specification, in which the figure is a side elevation.

This invention consists of a device for holding the platen of a cotton or hay-press down to its work when operating upon the loose material.

In the drawing—

E E' are boxes, placed loosely one above the other, upon the vertical guide-bar $a$, two at each end of the press, and below the projecting ends of the platen-bar, and $e$ $e$, &c., are dogs, connected by bolts with the boxes E E', in such manner that the dogs may be vibrated, to an extent, in the boxes.

The dogs are provided with transverse grooves, $e'$ $e'$, &c., on their under sides, which grooves are filled by the lower ends of links $a'$ $a'$ $b$ $b$, the two former of which connect the two upper dogs with hooks $a''$ $a''$, on the ends of the platen-bar H, while the links $b$ $b$ connect the two lower dogs with the levers B B.

The levers B are also connected with the hooks $a'''$ $a'''$ of the platen-bar by links $c$ $c$.

By the conjoint operation of the links $b$ $c$ and lever B, the platen is made to descend, the levers being lowered at their outer ends, and the links $b$ pressing the eccentrical dog $e$ of the boxes E' against the vertical guide-bars $a$ with sufficient force to clamp said dog and bar together, and hold the boxes E' down.

On raising the levers B for a fresh compression, the links $a'$ immediately clamp in like manner the upper dogs $e$ against the vertical guide-bars, and prevent the platen from yielding to the reaction of the compressed material.

Whenever one set of boxes is fast on the vertical guide-bars, the other set is loose, so that the boxes accompany the platen downward as long as it descends.

Having thus described our invention,

What we claim as new, and desire to secure by Letters Patent, is—

The sliding boxes E E', each provided with a dog, $e$, the upper one of which is connected by the link $a'$ with the platen-bar H, and the lower one of which is connected by the link $b$ with the lever B, in combination with said lever, when the latter is connected with the platen-bar by the link $c$, and with the vertical bar $a$, all constructed and arranged to operate as described.

B. R. BROWN.
JAMES TOONE, JR.

Witnesses:
JAS. W. ANDERSON,
JAMES HART.